United States Patent
Guenther et al.

(10) Patent No.: US 6,326,710 B1
(45) Date of Patent: Dec. 4, 2001

(54) ELECTRIC MOTOR

(75) Inventors: Klaus Guenther; Manfred Kirn; Friedrich Hornung, all of Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,510

(22) PCT Filed: Aug. 19, 1998

(86) PCT No.: PCT/DE98/02416

§ 371 Date: May 18, 2000

§ 102(e) Date: May 18, 2000

(87) PCT Pub. No.: WO99/10966

PCT Pub. Date: Mar. 4, 1999

(30) Foreign Application Priority Data

Aug. 27, 1997 (DE) .............................. 197 37 239

(51) Int. Cl.[7] .................. H02P 3/04; H02K 7/10
(52) U.S. Cl. ........................... 310/77; 310/93
(58) Field of Search ................ 310/261, 77, 92, 310/93, 75 R, 76, 123

(56) References Cited

U.S. PATENT DOCUMENTS

| | | | |
|---|---|---|---|
| 2,340,052 | * | 1/1944 | Grimes ............ 310/77 |
| 2,488,880 | * | 11/1949 | Piron ............ 310/77 |
| 2,959,695 | * | 11/1960 | Huff ............ 310/77 |
| 5,081,387 | * | 1/1992 | Nystuen ............ 310/191 |
| 5,982,063 | * | 11/1999 | Lutz et al. ............ 310/77 |

FOREIGN PATENT DOCUMENTS

2401846 * 7/1974 (DE).
2004422-A * 3/1979 (GB).

* cited by examiner

*Primary Examiner*—Nestor Ramirez
*Assistant Examiner*—Guillermo Perez
(74) *Attorney, Agent, or Firm*—Michael J. Striker

(57) ABSTRACT

An electric motor has a switching device, a driving circuit connectable to a voltage supply through the switching device and having a drive shaft, a mechanically acting braking device for braking the drive shaft when disconnecting the electric motor from the voltage supply, a rotor serving to generate torque and acted upon by a mechanical braking force when switching off the voltage supply, at least one radially displaceable part which applies the braking force and is magnetizable and acted upon by an electromagnetic releasing force which is directed opposite to the braking force and is greater than the braking force, and a stator having an axial slit which is overlapped by the part, and at least one shorted turn arranged in an area of the slit.

13 Claims, 6 Drawing Sheets

ELECTRIC MOTOR

BACKGROUND OF THE INVENTION

The invention is directed to an electric motor, in particular for an electric tool, with driving means that can be connected to a voltage supply via switching means.

Electric tools are known. They have an electric motor whose drive shaft actuates a tool carrier, for example, a clamping element for receiving tools. Such known electric tools are, for example, drill machines, angle grinders, circular saws, and the like. To switch off these electric tools, they are cut off from the voltage supply, in particular via an on/off-switch. Because of the rotational energy stored in the rotating tool, this results in that the time to slow down to a full stop, or run-down times, can sometimes be very long. This can create dangerous situations for an inattentive user. Apart from the existing danger of injury, the tool cannot be put down without due attention until after a long pause when the tool comes to a stop.

In order to reduce run-down times in electric tools, it is known to provide them with a braking device. Apart from an electrodynamic brake in which the electric motor is switched from a motor operation to a generator operation after the electric tool is switched off, braking devices that act mechanically are also known. For this purpose, known electric tools have separate brake disks arranged on a drive shaft, a ring-shaped brake lining pressing against these brake disks when the electric motor is cut off from the voltage supply. This solution has the disadvantage that additional space must be provided in the electric tool for housing the brake disk and the brake lining.

A braking device for motors in which a brake pad integrated in a stator can be pressed against the stator by the force of a spring element is known from DE 2 401 846. A releasing force can be applied to the brake pad by means of a magnetic field.

A braking device for an electric motor in which active parts of the magnetic circuit of the stator form parts of the braking device and in which the later are embedded in the magnetic circuit of the stator field poles is known from DE 1 114 573 A.

Another braking device for electric motors in which mechanically acted braking devices are integrated in the stator is known from WO 97/09769.

SUMMARY OF THE INVENTION

The electric motor according to the invention offers the advantage that a mechanically acting braking device can be integrated easily and does not need any additional installation space, nor does it influence the operating behavior of the electric motor. Due to the fact that at least one short-circuited or shorted turn is arranged in the area of the slit, the electromagnetic generation of releasing force can also be ensured in the universal motor with alternating voltage. As a result of the shorted turn, the drop in magnetic flux occurring during zero crossings of the alternating voltage is compensated for. This prevents flatter in the magnetizable parts which are displaceable radially for the purpose of braking the rotor.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The invention is described more fully in the following by embodiment examples with reference to the accompanying drawings.

DESCRIPTION OF THE PREFERRED EXAMPLES

Figure 1:
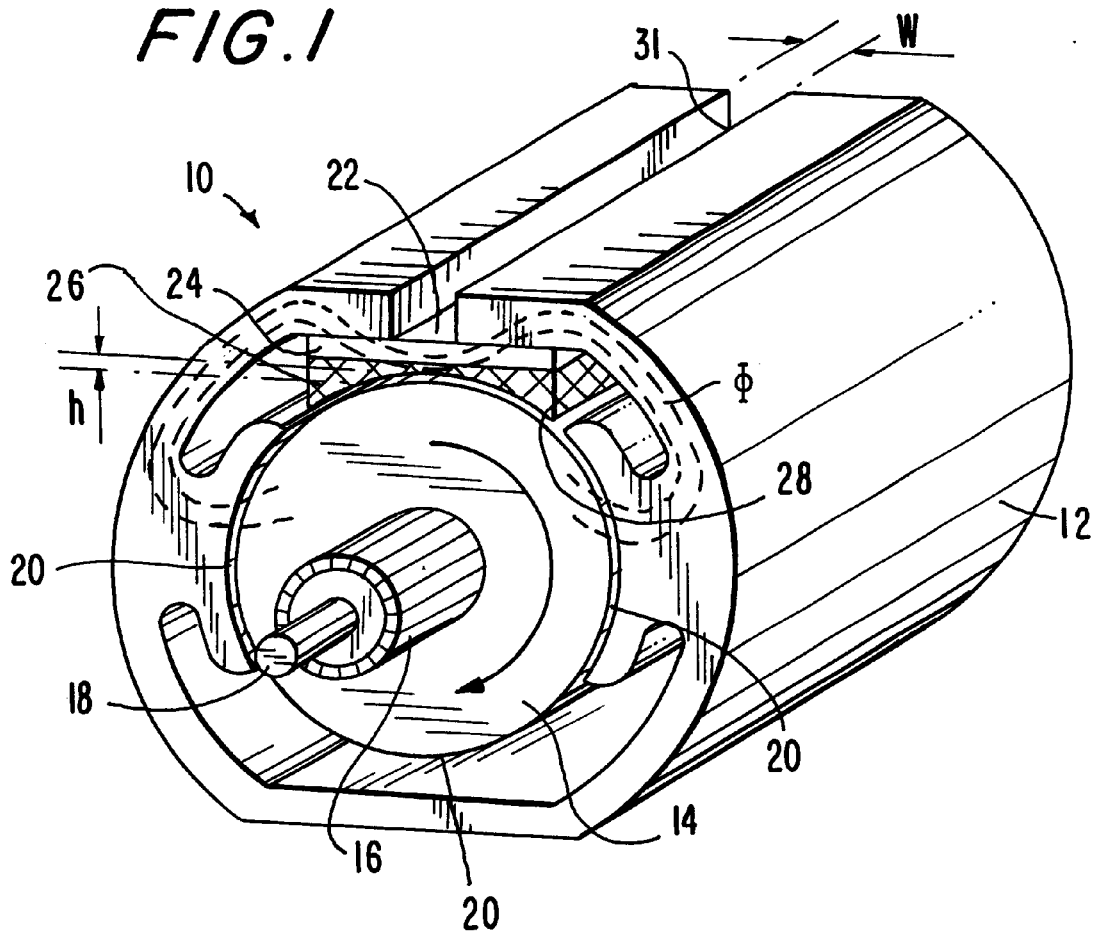
FIG. 1 shows a partial perspective view of a universal motor.

FIG. 1 shows the construction of a universal motor 10 in a schematic perspective view. An armature 14 is mounted symmetric with respect to rotation inside a stator 12 in bearings, not shown. The armature 14 has armature windings, not shown in detail, which are arranged in grooves of the armature and electrically connected via a commutator 16. The armature 14 is arranged on a drive shaft 18 of the universal motor 10 used for the transfer of the rotational movement. The stator 12 has pole shoes 20 which carry windings, not shown in detail. The construction and operation of universal motors are generally well known, so that this need not be explored within the framework of the description. Universal motors 10 of this type are used, for example, for driving electric tools in which the drive shaft 18 drives a tool carrier receiving a tool. For this purpose, the universal motor 10 is connected to a supply voltage which causes the armature 14 to rotate in a known manner. After switching off the supply voltage, the armature 14 continues to rotate because of the rotational energy stored in the armature 14 or in a tool attached to the drive shaft 18, for example, the saw blade of a circular saw, the grinding disk of an angle grinder, and the like. The mechanically active braking devices which are described more fully hereinafter are provided to ensure that the armature 14, and therefore the tool, brakes as promptly as possible once the supply voltage is switched off.

According to the embodiment example shown in FIG. 1, there is provided a brake shoe 22 which is constructed of a base plate 24 and a brake lining 26. The axial extension of the brake shoe 22 corresponds to the axial extension of the armature 14. A braking surface 28 of the brake lining 26 follows a curvature that corresponds to the curvature of a surface 30 of the armature 14. In the area of the brake shoe 22, the stator 12 has an axially extending slit 31 whose width w is greater than approximately twice the lift or travel h between the braking surface 28 of the brake shoe 22 and the surface 30 of the armature 14. The travel h can, for example, have a value of 0.5 to 1 mm.

Figure 2:
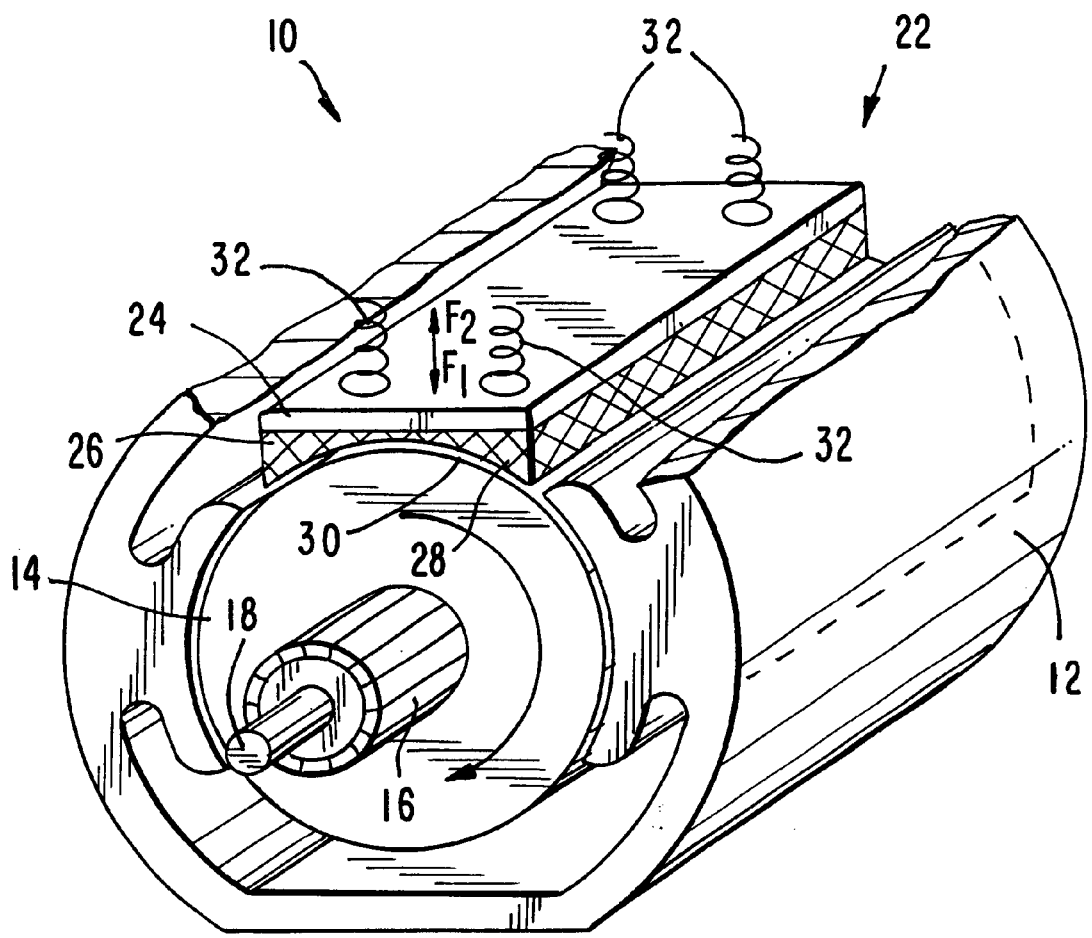
FIG. 2 shows a partial sectional view of the universal motor according to FIG. 1.

In the partial sectional view of the universal motor 10 shown in FIG. 2, it is evident that the base plate 24 has at least one spring element 32 and in the example has four spring elements 32 which are supported at the stator 12. This allows the braking surface 28 of the brake shoe 22 to be pushed by the spring elements 32 against the surface 30 of the armature 14 and thus to generate a braking torque. This braking torque is proportional to the strength of the spring forces exerted by the spring elements 32. This braking force corresponding to the spring forces is independent of the other constructional features or conditions of use of the universal motor 10 and is thus constant during the braking of the rotor 14 to be discussed hereinafter. This results in a substantially gentle, even braking without jerking. In accordance with the selected spring elements 32, the braking period can be adjusted via their spring force. Accordingly, the braking device functions completely independent of the previous operational state of the universal motor 10 and acts immediately when the voltage supply of the universal motor 10 is interrupted. In this way it is ensured, for example, that the braking effect of the braking device is activated immediately even in case of chance interruption of the voltage supply.

In the example shown herein it is assumed that a brake shoe 22 is provided. According to further examples, two or more brake shoes 22 are provided which, for example, are located diametrically opposite to the armature 14.

To interrupt the function of the braking device during appropriate use of the universal motor 10, this braking device must be acted upon by a releasing force $F_2$ that is greater than the braking force $F_1$ applied via the spring elements 32, since otherwise the brake shoe 22 would constantly drag on the armature 14. The braking force $F_1$ acts radially on the armature 14 and the releasing force $F_2$ likewise acts radially with a direction vector offset by 180°. To guarantee the functioning of the braking device, the releasing force $F_2$ must be effective when the universal motor is connected with the supply voltage so as to compensate for the braking force $F_1$. When the supply voltage is switched off, the releasing force $F_2$ must become ineffective immediately, so that the braking force $F_1$ can act upon the armature 14. According to the various embodiment examples, the releasing force $F_2$ can be generated electromagnetically, mechanically or hydraulically.

For the embodiment example shown in FIGS. 1 and 2, the releasing force $F_2$ is generated electromagnetically. In the switched off state of the universal motor 10, the brake shoe 22 is in contact with the armature 14. This creates an air gap in each instance between the stator 12 and the base plate 24 that corresponds to the travel h. Since the width w of the slit 31 is greater than approximately twice the travel h, the total length of the air gap that results between the stator 12 and the base plate 24 is less than width w. This allows the magnetic field B (indicated schematically in FIG. 1) that builds up when the universal motor 10 is switched on to close essentially through the base plate 24 of the brake shoe 22. Because of the magnetic flux $\phi$ building up, a magnetic force is generated which acts as releasing force $F_2$ and which is greater than the braking force $F_1$ of the spring elements 32. In this way, the brake shoe 22 is pulled against the stator 12 by its base plate 24 and the brake shoe 22 itself is released from the armature 14.

To guarantee the electromagnetic generation of the releasing force $F_2$ for the operation of the universal motor 10 with alternating voltage, it is necessary to compensate the drop in magnetic flux $\phi$ resulting at the zero crossing of the alternating voltage. Without any compensation, the brake shoes 22 would tend to flutter. For this purpose, according to FIG. 3, the base plate 24 of the brake shoe 22 is provided with axially extending grooves 34 into which shorted turns 36 have been inserted. The shorted turns 36 comprise portions 38 of the base plate 24, whose total area approximately corresponds to half the surface area of the base plate 24 minus the overlap surface area with the slit 31. The partial flux encompassed by the shorted turn is phase-shifted in a manner known per se by the shorted turns. The sum of both partial fluxes is at no point in time equal to zero, which prevents a drop, brake shoe 22 in the region of the zero crossing.

Figure 3:
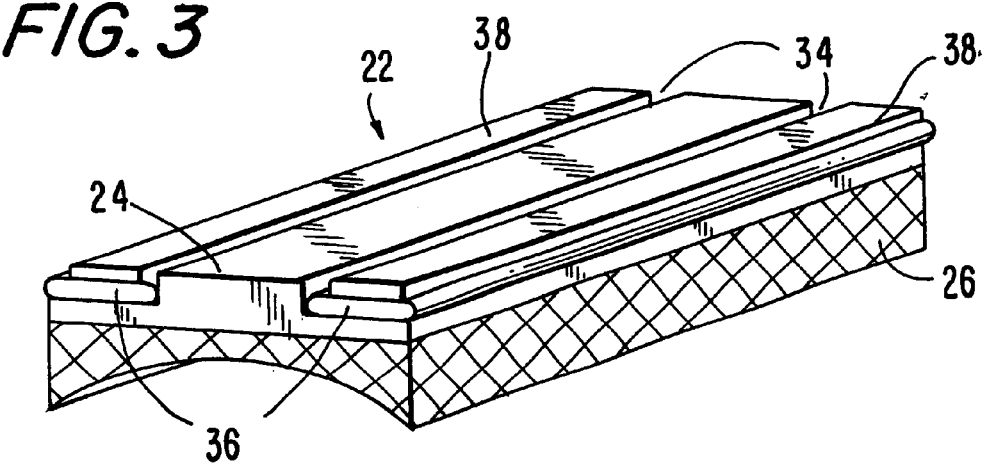
FIG. 3 shows a perspective view of a brake shoe.

The brake shoe 22 shown in FIG. 3 further has spring elements 32, not shown here for reasons of clarity.

Figure 4:
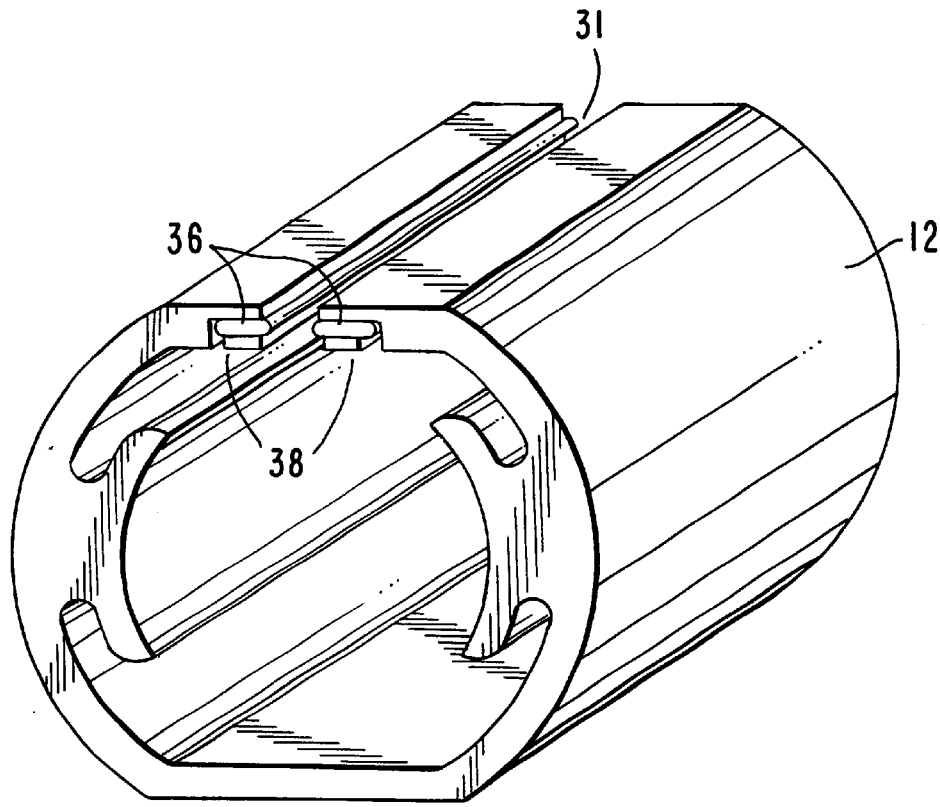
FIG. 4 shows a perspective view of a stator core.

FIG. 4 shows another possible way of integrating the shorted turns 36. For this purpose, the stator 12 has axially extending grooves 38 which run parallel to the slit 31 and are open in the direction of the armature 14. These grooves 38 serve to receive the shorted turns 36. Here again, the surface area encompassed by the shorted turns amounts to half the area of the base plate 24 minus the overlap area of the base plate 24 with the slit 31.

Figure 5:
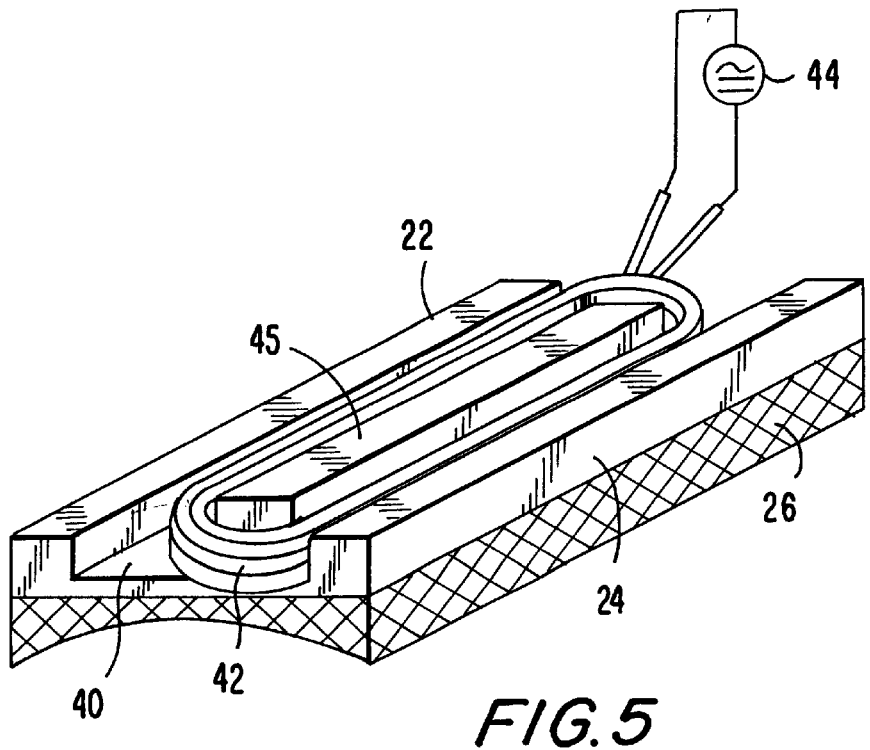
FIG. 5 shows a perspective view of a brake shoe.

It is known to combine universal motors 10, for example, in electric tools, with control electronics by means of which speed regulation can be carried out, for example. Generally, a phase angle control is used for this, leading to formation of "gaps" in the supply voltage and thus in the magnetic flux. In this case, to achieve a releasing force $F_2$ which is greater than the braking force $F_1$ also in the voltage phases, the arrangement of the brake shoe 22 shown in FIG. 5 can be used. For this purpose, the base plate 24 has axially extending grooves 40 serving to receive a coil winding 42. The grooves 40 are incorporated in such a way that a core 45 is formed between the grooves 40, the coil winding 42 being arranged around this core 45. The coil 42 is connected to a voltage source 44, for example, a constant voltage source or an alternating voltage source without phase control. In this way, there is generated in the base plate 24 a magnetic field which draws the brake shoe 22 against the stator 12 and thus frees the armature 14.

Figure 7:
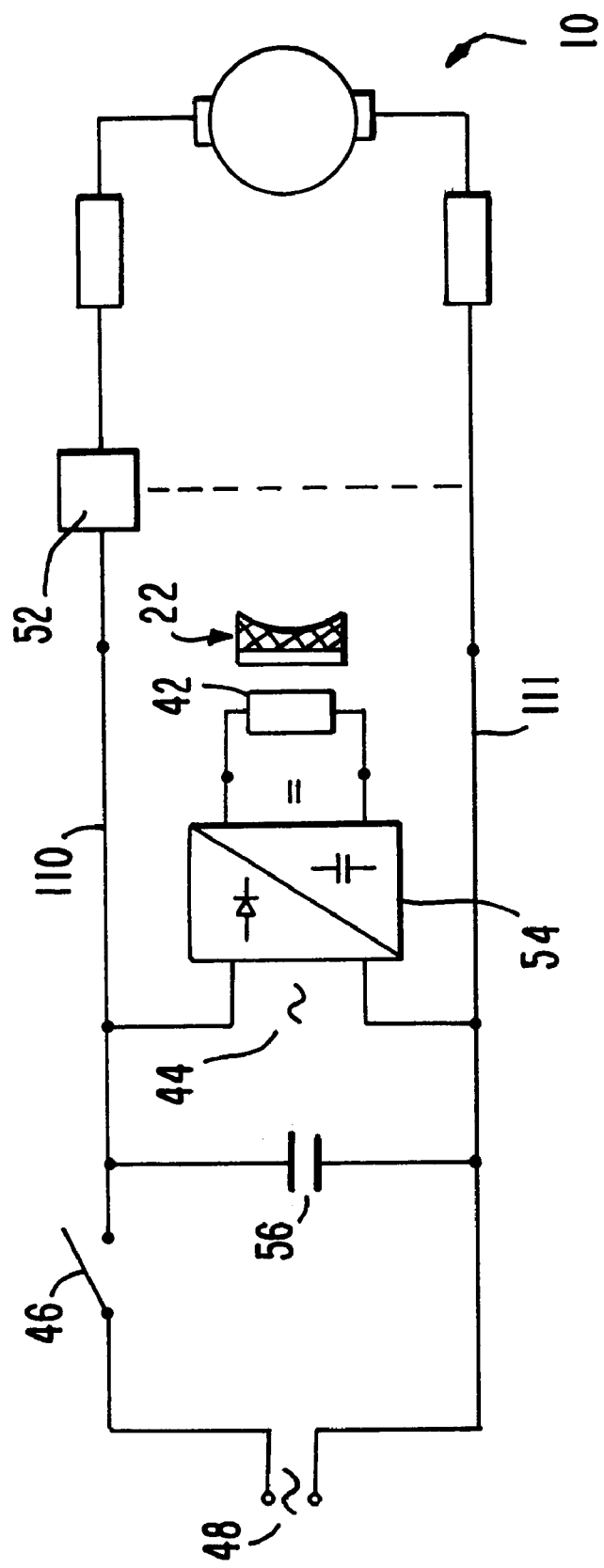
FIG. 7 shows a circuit arrangement for a braking device for a universal motor.

A possible variant of the circuit is shown in the circuit arrangement in FIG. 7. The universal motor 10 can be connected to a supply voltage source 48 via an on/off-switch 46. Control electronics 52 which, for example, permit speed regulation of the universal motor 10 using phase control are provided for controlling the motor 10 (FIG. 1). The brake shoe 22, indicated only schematically in this case, is provided with the coil 42 which can be controlled via the voltage source 44. The voltage source 44 comprises a rectifier unit 54 that generates a constant voltage, to be applied to the coil 42, from the alternating voltage of the supply voltage source 48. An anti-interference capacitor 56 is also provided.

The circuit arrangement shown in FIG. 7 allows the coil 42 to be supplied with a voltage that is tapped from two voltage branches 110 and 111 inside the machine behind the on/off-switch 46 and before the control electronics 52. This ensures that the releasing force $F_2$ is active when the universal motor 10 is switched on and will not be affected by the phase-controlled voltage of the universal motor 10. Therefore, it is also ensured that when the universal motor 10 is switched on the releasing force $F_2$ is immediately superimposed on the braking force $F_1$ and cancels it and that when the universal motor 10 is switched off the releasing force $F_2$ immediately returns to zero, so that the braking force $F_1$ causes the radial displacement of the brake shoe 22 on the armature 14.

Figure 8:
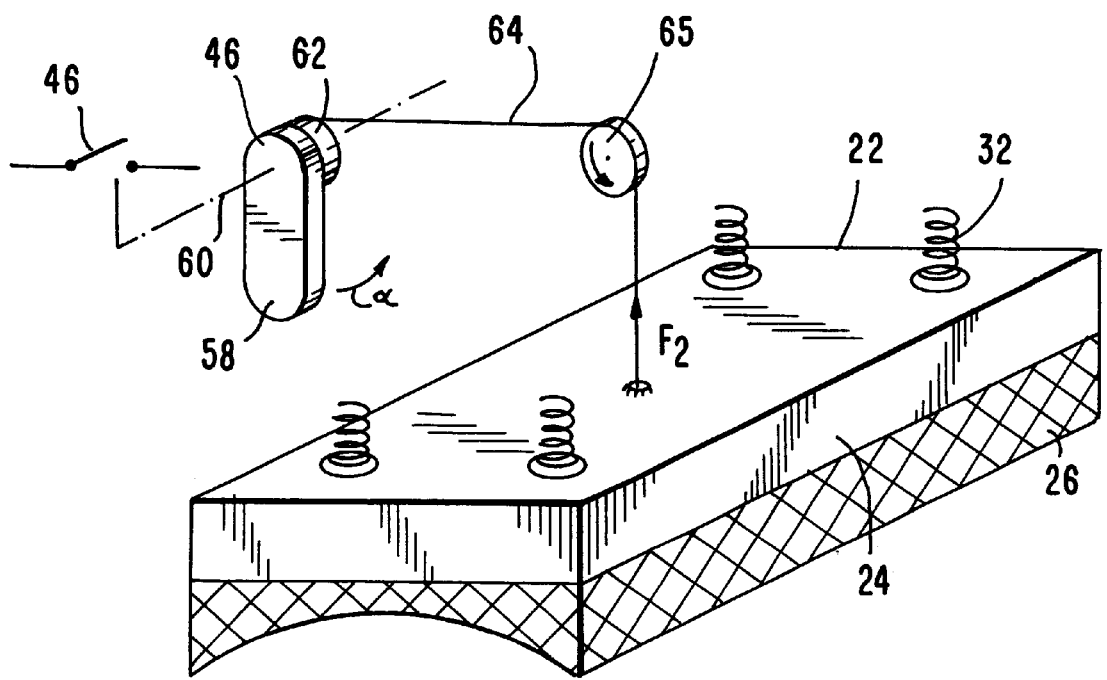
FIG. 8 shows schematic perspective views of brake shoes.

When the braking device is activated, that is, when the brake shoe 22 is in contact with the rotating armature 14, a tangential force $F_3$ is applied to the brake shoe 22 (FIG. 8). This acts in the direction of rotation of the armature 14. To contain the tangential force $F_3$, recesses 68 can be provided in a housing 66 of the universal motor 10 on both sides of the stator 12, in which recesses 68 the brake shoe 22 can engage at least when the base plate 24 is lengthened axially in a corresponding manner. Another possibility consists in providing the base plate 24 with axially extending projections 70 that engage in a correspondingly adapted recess 72. The occurring tangential force $F_3$ is therefore contained by the housing 66.

Figure 6:
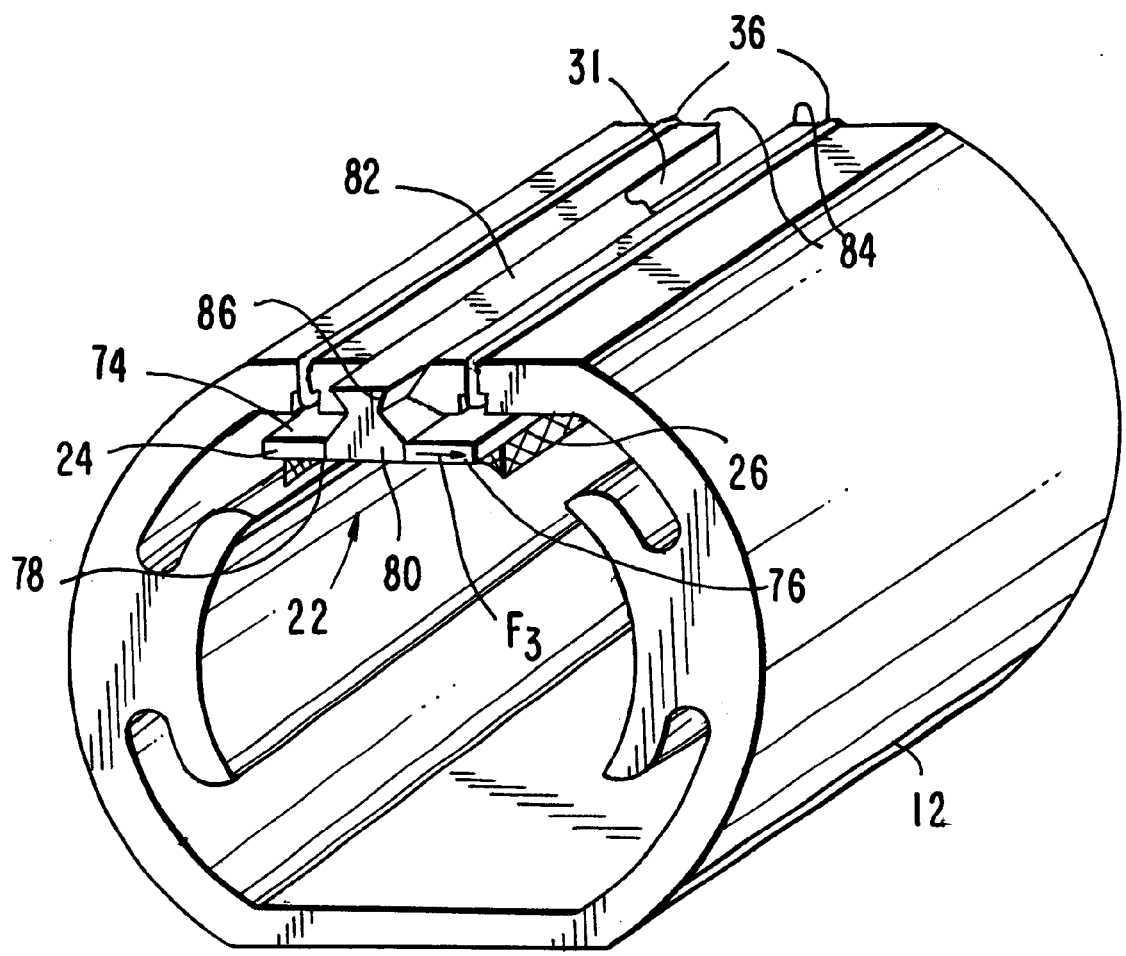
FIG. 6 shows a perspective view of a stator core.

A further possibility for containing the tangential force $F_3$ is shown by the embodiment example in FIG. 6. In this case, the base plate 24 of the brake shoe 22 is extended axially beyond the stator 12. In the lengthened area 74, incisions 78 which open to the edge are provided in the axial front sides 76 of the base plate 24. Protrusions 80 of a holding element 82 that extend radially engage in these incisions 78. The holding element 82 is made of a material that can not be magnetized, for example, plastic. The holding element 82 is inserted in the slit 31 by way of a positive engagement. For this purpose, the front sides 84 of the stator 12 that are located opposite to each other can be conical and engage in corresponding axial grooves 86 of the holding element 82. This arrangement allows the tangential force $F_3$ to be contained or intercepted by the protrusions 80 engaging in the incisions 78, while the radial travel or lift of the brake shoe 22 is possible. The holding element 82 also acts in an advantageous manner as a spacer for the slit stator 12.

For the arrangement of the spring elements 32, not shown in FIG. 6, the holding element 82 has pocket holes open in the direction of the brake shoe 22 in which the spring elements 32 can engage. This makes it possible that the travel of the spring elements 32 can be lengthened relative to a point of rest on the inside of the stator 12. In this way, softer spring characteristics and a correspondingly adapted braking behavior can be achieved.

In general, it will be appreciated that a mechanical braking device that does not need any additional installation space inside an electric tool having the universal motor can be provided by means of simple mechanical and/or electrical component parts. In the solution that has been found, dual functions are achieved for the armature 14: on the one hand as a torque generating element, and on the other hand as a braking element. According to the embodiment example shown in FIG. 10, the stator is also given a dual function; on the one hand it acts as the field magnet and, on the other hand, as a brake shoe. The individual parts of the mechanically acting braking device can be produced in easy steps, for example, by stamping, drilling, injection molding, and so forth, can be easily integrated into the manufacturing process for the universal motor 10 and easily exchanged as replacement or expendable parts.

What is claimed is:

1. An electric motor, comprising switching means, driving means connectable to a voltage supply through said switching means and having a drive shaft; a mechanically acting braking device for braking said drive shaft when disconnecting the electric motor from the voltage supply; a rotor serving to generate torque and acted upon by a mechanical braking force when switching off the voltage supply; at least one radially displaceable part which applies the braking force and is magnetizable and acted upon by an electromagnetic releasing force which is directed opposite to the braking force and is greater than the braking force, and a stator having an axial slit which is overlapped by said part; and at least one shorted turn arranged in an area of said slit.

2. An electric motor as defined in claim 1, wherein at least one shorted turn is located in said stator.

3. An electric motor as defined in claim 1, wherein said radially displaceable part is a brake shoe which is integrated in said stator and has a base plate, said at least one shorted turn being located on said base plate.

4. An electric motor as defined in claim 1; and further comprising an armature which has an essentially cylindrical surface used as a braking surface.

5. An electric motor as defined in claim 4, wherein said part is a part of said stator and applies the braking force, said part being displaceable radially to said armature.

6. An electric motor as defined in claim 5, wherein said radially displaceable part is a brake shoe which is integrated in said stator.

7. An electric motor as defined in claim 6, wherein said brake shoe has a base plate composed of a magnetizable material, and a brake lining.

8. An electric motor as defined in claim 6, wherein said slit has a width which is greater than twice a lift between a braking surface of said brake shoe and a surface of said armature.

9. An electric motor as defined in claim 6; and further comprising at least one spring element which generates the braking force and rests on said brake shoe on one side, and on another side on said stator.

10. An electric motor as defined in claim 6; and further comprising at least one spring element which generates the braking force and rests on said brake shoe on one side, and on another side on another fixed part.

11. An electric motor as defined in claim 6; and further comprising a coil which is integrated in said brake shoe and connectable to a supply voltage source that is independent of control electronics for influencing operating parameters of the electric motor.

12. An electric motor as defined in claim 11, wherein said supply voltage source is formed by voltage branches which are internal to the electric motor and connected electrically behind an on/off switch but before the control electronics.

13. An electric motor as defined in claim 6; and further comprising means for securing said brake shoe against a deflection caused by a tangential force.

* * * * *